Aug. 27, 1929.     H. A. WIEAND     1,726,328
BAFFLE STRAINER FOR WATER CIRCULATING SYSTEMS AND THE LIKE
Filed June 26, 1928
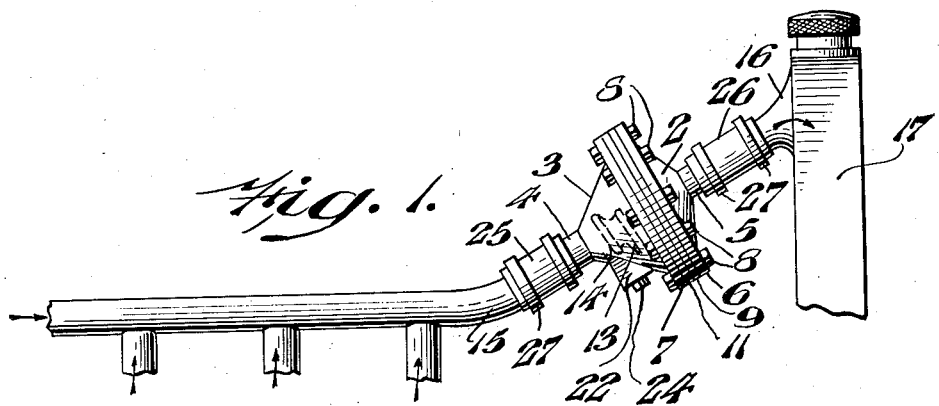
INVENTOR.
HENRY A. WIEAND,
BY
ATTORNEYS.

Patented Aug. 27, 1929.

1,726,328

UNITED STATES PATENT OFFICE.

HENRY A. WIEAND, OF WYNCOTE, PENNSYLVANIA.

BAFFLE STRAINER FOR WATER-CIRCULATING SYSTEMS AND THE LIKE.

Application filed June 26, 1928. Serial No. 288,335.

My invention relates to a new and useful strainer for straining liquids, and more particularly to a strainer for straining confined, circulating liquids such as the cooling water in radiators of automotive vehicles and the like, whereby such liquids are both strained and I also utilize gravity for precipitating foreign matter such as dirt, sand, iron scale and other impurities having a greater specific gravity than said liquids.

My invention further relates to a novel strainer, wherein a dirt pocket for the precipitated foreign matter or sediment is provided, so that such sediment may be removed from time to time without dismantling the unit or in any way interfering with the circulation of the liquid being used for cooling or other purposes.

My invention still further relates to a novel construction of a liquid strainer particularly adapted for use in connection with automotive vehicles whereby the water confined in the radiator and circulating system is constantly filtered and strained from all impurities and solid matter in suspension in the water to prevent the clogging and obstruction of the minute passages through which the water circulates in said radiator.

My invention still further relates to a novel strainer of a highly simplified and efficient construction and one which is extremely durable and very inexpensive to produce.

My invention still further relates to a novel strainer which may be applied to or installed in the cooling system of any make of automotive vehicle or other machinery or any kind of water cooling and heating systems without in any way interfering with the present construction and assembly of such machines and systems.

To the above ends my invention consists of a two part casing adapted to be connected to the circulating system, having its inner juxtaposed faces detachably secured to each other in a water tight manner, a screen positioned intermediate said juxtaposed faces, and a baffle unit in the inlet section of said casing and a dirt pocket formed below said baffle unit for receiving the solid matter precipitated by said baffle unit and said pocket being readily accessible and capable of being drained and cleansed without dismantling said strainer or interfering with the functioning thereof.

My invention further consists of various other novel features of construction and advantage, all as hereinafter described and claimed.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawings.

Figure 1, represents a fragmentary view in side elevation showing a radiator and a portion of an automobile cooling system and the manner of applying my novel strainer to said cooling system of an automobile, or the like.

Figure 2, represents on an enlarged scale, a vertical sectional view of my novel strainer on line 2—2 Fig. 3.

Figure 3, represents a section on line 3—3, Figure 2 viewed in the direction of the arrows, the pocket formed in the rear casing being shown dotted.

Figure 4, represents a view in side elevation of the novel baffle unit shown detached.

Referring to the drawings, in which like reference characters indicate like parts, 1 designates my novel strainer comprising the front and rear funnel shaped casing sections 2 and 3, having the inlet and outlet pipes 4 and 5 and having the inner faces 6 and 7 thereof secured to each other in a water tight manner by the bolts 8. Between the inner juxtaposed faces 6 and 7 of the casing sections 2 and 3 is positioned the ring 9 which carries the screen 10 of any desirable mesh or gauge, and the ring 11 which carries the inclined baffles 13 and 14, which are connected to each other and to said ring by the webs 15 and 16, the rings 9 and 11 and their adjuncts being held in position by the bolts 8, as will be understood from Figure 2.

The inlet pipe 4 of the casing section 3 is connected to the pipe or manifold 15 leading from the water jackets of the engine cylinders while the outlet pipe 5 of the casing section 2 is connected to the end of the pipe 16 leading to the radiator 17. The heated water flowing from the cylinder jacket into the radiator enters the casing section 3 from the pipe 15, in the direction of the arrow 19 and impinges upon the inclined outer or primary baffle 14, which diverts the water and thus causes some of the sediment suspended therein to be precipitated towards the dirt pocket 22. The water then flows under and around the secondary baffle 13 in the direction of the arrow 20 seen in Fig. 2 where it is further diverted by the inner or secondary baffle 13 to cause the precipitation of the finer particles of sediment which were not initially precipitated by the outer primary baffle 14. The water then flows over the secondary baffle 13 in the direction of the arrow 21 through the screen 10 into the exit casing section 2 and out through the exit pipe 5 into the pipe 16 leading into the top of the radiator 17. The sediment precipitated by the baffles 13 and 14 accumulates in the dirt pocket 22 formed in the bottom of the inlet casing section 3, just below the baffles 13 and 14, as will be understood from Fig. 2. The dirt pocket 22 is provided with the bottom drain port 23 normally closed by the plug 24 through which the accumulated sediment may be blown off or discharged.

It will be apparent from Figs. 2 and 3 that the primary baffle 14 contacts for the greater portion of its periphery with the contiguous inner, conical surface of the inlet section 3, but at its lower portion there is a well defined passage above the dirt pocket 22 to permit the flow of the fluid at a low velocity, thus causing eddies of other fluid which precipitates the foreign substances or solid matter. The fluid after passing the lower periphery of the primary baffle 14 flows upwardly between both baffles still at a reduced velocity and thence over the top of the secondary baffle 13, at a slightly higher velocity, thus further precipitating all foreign substances still in suspension. Any remaining particles of solid matter in the fluid not removed by the aforesaid baffles are retained on the inlet or left hand side of the screen 10.

By reason of the downward inclination of the primary and secondary baffles, it is obvious that the precipitation of the solid matter is somewhat accelerated, and in addition I am enabled to provide the necessary areas within the casing sections to provide for the precipitation, and in addition I am enabled to produce a very compact device having a minimum overall length whereby one standard structure is capable of universal application.

It will be seen from the foregoing that by applying a strainer of my novel construction to the cooling system of an automobile, the water is thoroughly strained on each circulation of the system and all core sand and iron scale and other solids carried by the water in suspension in said system are removed, thus preventing the clogging or obstruction of the minute radiator water passages through which the water circulates and thus insures a more constant and efficient cooling. By the employment of my device the troublesome and expensive repair operations involved when the water circulating radiator passages become clogged are thus entirely eliminated, the sediment being thus removed by the baffles and screen and accumulated in the dirt pocket 22, whence it can be removed periodically without expense or the employment of highly skilled labor.

The operation is as follows:—

The water from the cylinder jacket of an automobile flows through the inlet 4 in the direction of the arrow 19 where it impinges upon the baffle 14 which contacts along its upper periphery with the casing 3 and which is forwardly inclined as will be seen from Figure 2. The water carrying in suspension particles of rust, scale or carbon from the engine block is thus forced to travel downwardly along the inclined surface of the baffle 14 and upwardly in the direction of the arrow 20. As the water travels downwardly the baffle 14 not only retards the flow of the water and thus causes precipitation of the coarser sediment held in suspension therein due to loss of velocity but it also directs such sediment downwardly towards the pocket 20, in a positive manner which is not obtainable by the use of a mere conventional vertical baffle which is open along its entire circumferential periphery and which does nothing more than retard the flow of water to decrease its sediment carrying capacity, and to reduce its impact against the straining element. This result is obtained by the employment of an inclined baffle 14 closed at its upper periphery thus forcing the water to flow beneath said baffle towards the dirt pockets 22 to deposit the sediment therein. The sediment thus deposited in the pocket 22 tends to remain in said pocket due to the reduced carrying power of the water flowing beyond the baffle 14 in the direction of the arrow 20. To insure the further precipitation of the finer sediment still suspended in the water after passing beyond the baffle 14 and before it reaches the screen 10, I provide the second inclined baffle 13 which closes the bottom of the casing 3 (see Fig. 2) so that the water is forced to pass over the top of the baffle 13 in the direction of the arrow 21 thus further precipitating any sediment suspended in the water by further decreasing the velocity of the water (and consequently decreasing its carrying power) and by causing the sediment in the water impinging against the baffle 13 to travel upwardly against an oppositely inclined surface thus tending to direct such sediment downwardly toward the pocket 22 in a positive manner.

It will be seen that due to the fact that the velocity of the water has been twice retarded by the baffles 14 and 13 both of which converge and tend to direct the sediment towards the pocket 22 as above explained, my novel baffling and straining device is extremely efficient and produces desirable results not heretofore obtained.

It is to be noted that the function of my baffles 14 and 13 is not only the conventional function ordinarily accomplished by baffles used in connection with circulating systems or water pipes, namely, to cause precipitation of sediment by retarding the flow of the water, or to distribute the flow of water uniformly over the entire surface of the filtering element such as the screen 10, or to absorb the impact of the water impinging against the straining or filtering element, but in addition, my novel baffles serve to direct the sediment downwardly towards the pocket 22 (by means of the baffles 14 and 13) and to prevent the escape of said sediment from said pocket in a positive manner (by means of the plate 13) as above explained.

While I have described my novel strainer as applicable to the cooling system of an automobile, it is to be understood that the same is equally applicable to any other cooling or heating or other system, or wherever a body of liquid is confined and forced to circulate in any circulating system of this general character.

The manner of installing my device will be readily understood from Figure 1, the inlet 4 and exit 5 engaging the hose nipples 25 and 26, which may be provided with the hose clamps 27 of the usual construction.

It will also be apparent that my novel strainer is inexpensive to produce and is of very simple construction, and requires no attention or repair. It will further be seen that my novel strainer can be easily and quickly applied to any conventional automobile or other mechanism without involving any extensive alteration or modification of the strainer or the mechanism to which it is applied.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent is:—

1. In a combined baffling and straining device, an inlet section, an outlet section, a plurality of vertically and rearwardly inclined baffle plates positioned in said inlet section, a dirt pocket in the lower portion of said inlet section below said baffles, and a screen secured between said sections, said baffle plates contacting with the upper and lower portions of said inlet section respectively to force the water flowing therethrough in successive downward and upward directions.

2. In a combined baffling and straining device, an inlet section, an outlet section a plurality of vertical rearwardly inclined baffles positioned in the inlet section, a dirt pocket in the lower portion of said inlet section below said baffles, said baffles contacting alternately with the upper and lower walls of said inlet to force the water flowing therethrough in successive downward and upward directions, a support for said baffles, which is also integral therewith, and a screen positioned between said sections.

3. In a device of the character stated, a casing comprising inlet and outlet sections, a screen intermediate said casing sections, a baffle unit in said inlet section, comprising a pair of inclined, vertical plates contacting with the upper and lower walls of said inlet section respectively to form lower and upper ports for the water flowing through said inlet section and a pocket formed in the bottom of said inlet section for receiving the sediment precipitated by said baffle plates.

4. In a device of the character stated, a separable casing comprising inlet and outlet sections, means for clamping said sections together, a baffle unit consisting of a ring clamped between said sections, said ring having extended therefrom toward the inlet section, spaced, inclined, front and rear baffle plates, and a screen also clamped between said sections and abutting against that portion of said ring facing the outlet section.

5. In a device of the character stated, a separable casing comprising inlet and outlet sections, means for clamping said sections together, a baffle unit consisting of a ring clamped between said sections, said ring having extended therefrom toward the inlet section, spaced, inclined primary and secondary baffles, a web fixed to said ring and supporting said spaced baffles, a web for spacing said baffles, and a screen also clamped between said sections and abutting against that portion of said ring facing the outlet section.

6. In a device of the character stated, a separable casing comprising inlet and outlet sections, means for clamping said sections together, a baffle unit consisting of a ring clamped between said sections, said ring having extended therefrom toward the inlet section, spaced, inclined primary and secondary baffles, a screen also clamped between said sections and abutting against that portion of said ring facing the outlet section, a sediment chamber arranged in said inlet section to receive deflected sediment from said primary baffle, and a removable closure for said chamber.

7. The combination of an automobile radiator, having a water circulating system, with a combined baffling and straining device interposed between the upper exit of said water circulating system and the top inlet of said radiator comprising a screen, a rearwardly inclined baffle plate positioned in advance of said screen, adapted to retard and force the water of said circulating system in a downward direction to precipitate the sediment carried thereby, a pocket below said baffle plate adapted to receive the precipitated sediment, a rearwardly inclined baffle plate intermediate said pocket and said screen adapted to retard and force the water of said circulating system upwardly to precipitate the sediment remaining therein into said pocket and to prevent the sediment thus deposited in said pocket from escaping therefrom and reaching said screen.

8. A combined baffling and straining device for water circulating systems comprising a casing having a water inlet section and a water outlet section, a screen positioned intermediate said sections, a pocket in said inlet section below and in advance of said screen, baffle plates intermediate said pocket and said screen adapted to retard the flow of water through said inlet to cause precipitation of the sediment carried thereby into said pocket, said baffle plates being inclined in a direction opposite to the direction of the flow of water within said inlet frictionally to engage the sediment carried by the water flowing against said plate to force such sediment downwardly into said pocket in a positive manner and to prevent such sediment from escaping from said pocket and reaching said screen.

9. In a device of the character stated, the combination of an automobile radiator and the water circulating system thereof with a combined baffling and straining device interposed between the upper exit of said water circulating system and the top inlet of said radiator, comprising a casing having horizontally aligning inlet and outlet openings, a vertical rectilinear screen positioned in said casing intermediate said openings and a rearwardly and upwardly inclined baffle plate positioned in said inlet opening in advance of said screen.

10. In a device of the character stated, the combination of an automobile radiator and the water circulating system thereof with a combined baffling and straining device interposed between the upper exit of said water circulating system and the top inlet of said radiator and comprising a casing having horizontally aligning inlet and outlet openings, a vertical, rectilinear screen positioned in said casing intermediate said openings and a plurality of rearwardly inclined baffle plates positioned in said inlet in advance of said screen.

HENRY A. WIEAND.